Aug. 3, 1965  W. C. LANNING  3,198,847
PROCESSES FOR EXOTHERMIC THERMAL HYDRODEALKYLATION
Filed Sept. 5, 1961
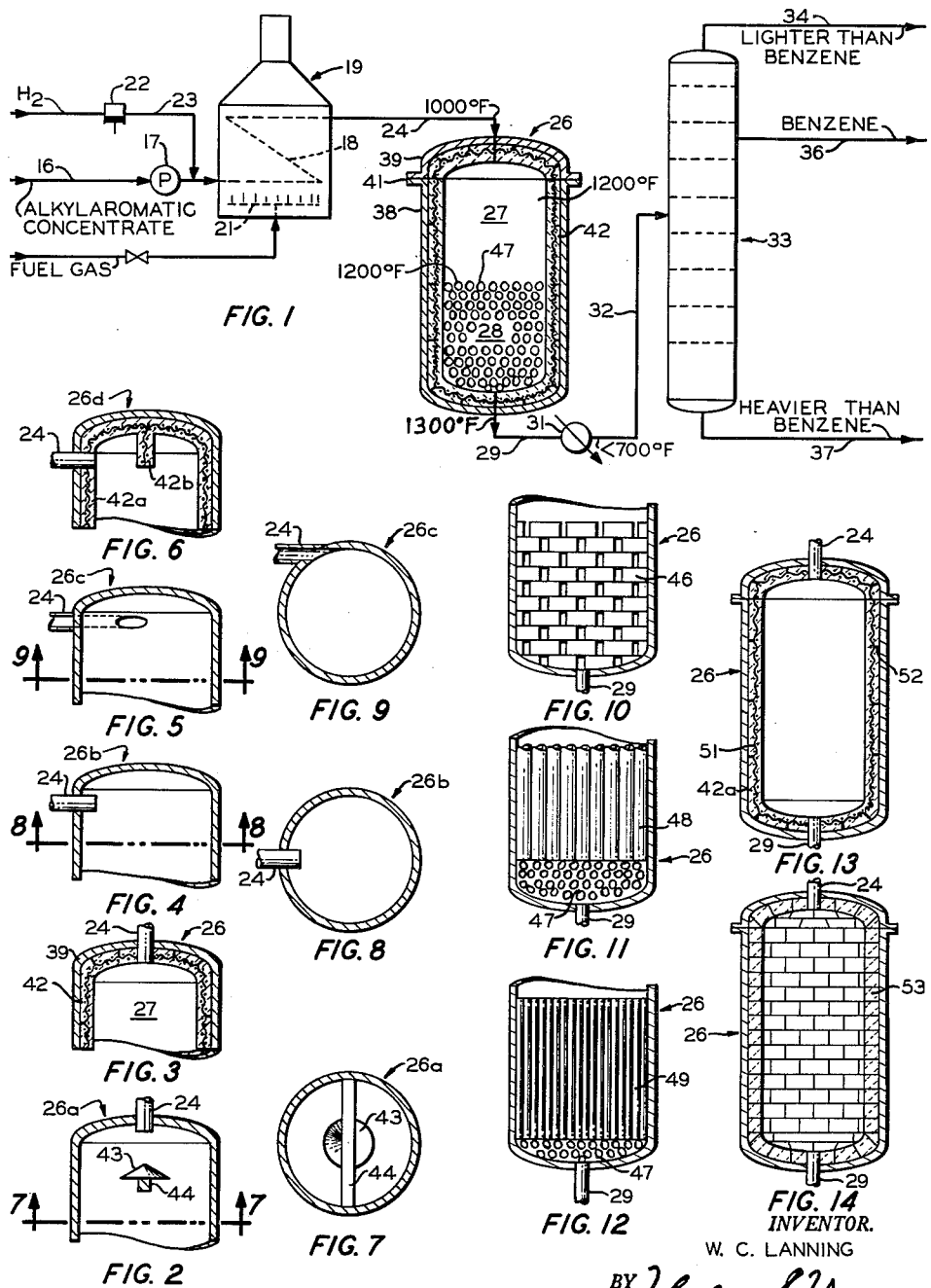
INVENTOR.
W. C. LANNING
BY Hudson & Young
ATTORNEYS

United States Patent Office 3,198,847
Patented Aug. 3, 1965

3,198,847
PROCESSES FOR EXOTHERMIC THERMAL HYDRODEALKYLATION
William C. Lanning, Bartlesville, Okla., assignor to Phillips Petroleum Company, a corporation of Delaware
Filed Sept. 5, 1961, Ser. No. 136,067
7 Claims. (Cl. 260—672)

This invention relates to reactors designed for exothermic thermal reactions and to exothermic thermal reactions suitable for use in said reactors. In one aspect, it relates to a reactor having a chamber partially vacant and partially filled with a permeable bed of noncatalytic, nonreactive, ceramic particulate solids, which may be in the form of pebbles, tubes, rods or checkerwork, disposed so as to establish linear flow of reactants through said bed and to thereby minimize large scale turbulence or back-mixing of the reacting fluid passing therethrough in the course of an exothermic thermal reaction. In another aspect, it relates to processes in which an exothermic thermal reaction is carried out by preheating a reactant feed in a zone comprising the vacant portion of such a chamber and then passing said preheated feed through a plurality of relatively restricted reaction zones in substantially linear flow therethrough while reacting said feed in an exothermic thermal reaction, thus preventing any large scale turbulence or back-mixing of the reacting portion of said feed. In another aspect, it relates to apparatus and processes for exothermic thermal hydrodealkylation of alkylaromatic hydrocarbons, such as toluene or xylene, to form aromatic hydrocarbons, such as benzene or naphthalene. In some instances these alkylaromatic hydrocarbons may be in the form of a concentrate, preferably 90 weight percent alkylaromatics and the remainder aliphatic and nonaromatic cyclic hydrocarbons is substantially the same boiling range, as would normally occur in a refinery in commercial streams of such concentrates. In another aspect, it relates to apparatus and processes for the exothermic thermal hydrocracking of aliphatic and nonaromatic cyclic hydrocarbons. In another aspect, it relates to processes and apparatus of the type described above in which lower preheat temperatures are necessary, which saves wear and tear on the preheating furnace and allows the tubes of the preheat furnace to be made of cheaper material, and in which overtreating of the feedstock in the reactor is obviated by the prevention of recycling after the exothermic thermal process is underway. In another aspect, metal dusting of the reactor vessel is reduced, especially when a ceramic lining is employed in the reaction vessel.

In the prior art of hydrodealkylation of alkylaromatics, a number of grave difficulties have arisen. Preheating the alkylaromatic feedstock and hydrogen mixture to the reaction temperature of about 1100 to 1350° F. in a tube furnace is too hard on the tubes. Even if made of the best material, the tubes tend to sag and powder at such temperatures, although the tubes can easily stand up in service when only heated to about 1000 to 1100° F. However, starting and maintaining this reaction has been impossible in the prior art without preheating to about 1100 to 1350° F.

The present invention overcomes these difficulties of the prior art by employing a relatively low preheat of the feedstock to about 1000 to 1100° F.; then mixing the resulting vapors with partially reacted, hotter vapors in an open, unrestricted, first zone to about 1150 to 1250° F. to initiate the reaction and then completing the reaction in linear nonreversing flow in restricted reaction zones between ceramic particles in a bed at temperatures progressively rising from about 1150° to 1250° F. at the top of the bed to 1250 to 1350° F. at the bottom of the bed; then quenching the effluent gases to below 1100° F. and preferably below 700° F.; and then separating the products of said reaction by any known means, such as fractional distillation. The ceramic particles should have their smallest dimension at least ½ inch and be disposed to form channels conductive to substantially vertical flow free from turbulence of a greater size than the diameter of said channels. The vertical extent of the particle may be from ½ inch to the total depth of the bed. The size of the particles and their disposition is such that the vertical extent of each flow channel through the bed is at least five times as great as its diameter.

One object of this invention is to provide an improved reactor for exothermic thermal reactions.

Another object is to provide processes for improved exothermic thermal reactions including the use of said improved reactor.

Another object is to provide improved processes of hydrodealkylation of alkylaromatic hydrocarbons and/or hydrocracking of aliphatic and nonaromatic cyclic hydrocarbons.

Other objects are to provide apparatus and processes for hydrodealkylation and/or hydrocracking in which lower preheat temperatures are possible than in the prior art and in which cheaper materials of construction may be used with less wear and tear due to heat sagging and hydrogen and high temperature-induced metal dusting of the apparatus.

Numerous other objects and advantages will be apparent to those skilled in the prior art upon reading the accompanying specification, claims and drawings.

In the drawings:

FIGURE 1 is a schematic elevational view with parts in cross section of a reactor and auxiliary equipment embodying the present invention.

FIGURES 2 and 4 are elevational cross-sectional views of the upper portion of five species of reactors, respectively, FIGURE 3 being the same species as shown in FIGURE 1.

FIGURES 7 to 9 are cross-sectional views taken along the lines 7—7, 8—8 and 9—9 of FIGURES 2, 4 and 5, respectively, looking in the direction indicated.

FIGURES 10 to 12 are cross-sectional views of the bottoms of reactors containing three species of ceramic beds, a fourth species of ceramic bed being shown in FIGURE 1.

FIGURES 13 and 14 are cross-sectional views of reactor chambers containing two species of internal ceramic lining, a third species of ceramic lining being shown in FIGURE 1.

In FIGURE 1 the feedstock for the exothermic thermal reaction, which in the case of hydrodealkylation may be an alkylaromatic hydrocarbon or alkylaromatic concentrate, enters the system through line 16 in liquid or vaporous form and is preferably pumped by pump 17 through the remainder of the system. Although pumps can be placed at other points in the system, it is preferred to have the pump at 17 so it will pump a relatively low temperature fluid, which is easier on the pump. Pump 17 pumps the feedstock through the heating coil 18 in furnace 19 heated by burner 21 or any other usual source of heat. A suitable amount of hydrogen gas for the reaction is provided under pressure, such as provided by compressor 22, and is forced through line 23 into the feedstock in heating coil 18, the mixture being heated to about 1000° F. This preheated mixture passes through line 24 into the top of reactor 26 having a chamber 27, the upper half of which is vacant and the lower half of which contains a bed of noncatalytic, nonreactive, ceramic pebbles.

In the upper vacant portion of chamber 27 above 28, the feedstock and hydrogen mixture entering through line 24 at 1000° F. churns around turbulently mixing with the immediately preceding feedstock which has commenced reacting and its temperature is immediately raised so that the average temperature in all parts of the vacant portion of chamber 27 above bed 28 is about 1200° F. throughout. The feedstock and hydrogen with which it is now reacting passes into the top of bed 28 at 1200° F. and completes its reaction while passing through a plurality of relatively restricted reaction zones with an adiabatic profile of from 1200° F. at the inlet to about 1300° F. at the outlet of said zones in said bed 28 in substantially linear flow therethrough without any turbulence of a scale larger than the diameter of said restricted reaction zones without backmixing of the reacting portion of said feedstock. The reacted feedstock passes out of the bottom of the bed 28 through line 29 at about 1300° F. and is preferably immediately quenched by indirect heat exchange with cooling water in quench 31 to preferably below 700° F., after which it passes through line 32 to any suitable reaction effluent separating system known to the prior art, such as fractional distillation tower 33, where it is separated into suitable fractions. In the case of hydrodealkylation of an alkylaromatic concentrate for the production of benzene, the suitable fractions would be taken off in lines 34, 36 and 37 as fractions lighter than benzene, benzene, and heavier than benzene, respectively. While tube 29 is operating at a high temperature, it can be made much shorter than shown in the drawing and/or made of known high temperature-resistant alloys and/or pipe made with ceramic internal insulation can be used (by purchasing such pipe presently available on the market or by making pipe 29 large and continuing insulation 42 inside it in the same manner as 42 is inside chamber 38). Also, replacing pipe 29 is easier and less costly than replacing long pipes 18 and/or 24.

Indirect heat exchange quench 31 could be replaced by spraying water or heavy oil directly into the reactor effluent in line 29 (not shown), in which case the added cooling fluid is removed from separation system 33 through lower pipe 37 because of its higher boiling point and higher specific gravity compared to benzene.

Reactor 26 in FIGURE 1 may be constructed for purposes of assembly from lower 38 and upper 39 cylindrical steel members, each having oppositely disposed closed ends through which outlet line 29 and inlet line 24 pass. Any suitable connection known in the prior art may be employed to connect the two halves 38 and 39, such as flanges 41, which may be welded together or connected by the usual nuts and bolts (not shown). The steel shells 38 and 39 may be lined with any suitable ceramic, cementitious material of the prior art 42 applied in the form of an aqueous mortar which dries and sets in place, effectively lining the steel shell. Lines 24 and 29 extend through the mortar into communication with chamber 27. The bed of noncatalytic, nonreactive, ceramic pebbles 28 is preferably formed by pouring pebbles of the type used in the prior art in many pebble heater patents into the lower half of chamber 27 where they are retained by gravity, aided partially by the flow of feedstock through the reactor.

While in FIGURES 1 and 3 the feedstock enters the top 39 of the reactor 26 axially through line 24, this is only one of the preferred ways in which the feedstock may enter the reactor from pipe 24 to provide turbulence and rapid mixing in space 27 above bed 28. In FIGURES 2 and 7 the feedstock enters reactor 26A axially through line 24 but impinges on a target 43 preferably made in the form of a cone which is mounted on support 44 directly opposite inlet line 24, which target creates increased turbulence and more rapid mixing than the simple axial pipe 24 in FIGURES 1 and 3.

In FIGURES 4 and 8 the inlet pipe 24 enters reactor 26B along a diameter thereof, causing greater turbulence and mixing in space 27 above bed 28 than in FIGURES 1 and 3.

In FIGURES 5 and 9 the pipe 24 leads tangentially into reactor 26C so that there is more turbulent whirling and mixing in chamber 27 than in FIGURES 1 and 3.

In FIGURE 6 the reactor 26D contains a ceramic lining 42A which is formed with a ceramic boss 42B directly in the path of the feedstock entering the reactor along its diameter through line 24.

It will be noted that the interrupting target 43 in FIGURE 2 is made of steel and that FIGURES 2, 4 and 5 do not have any ceramic lining, whereas FIGURES 1, 3 and 6 have a ceramic lining and the target 42B of FIGURE 6 is made of ceramic material. Obviously, any of the reactors shown in FIGURES 2–9 could be lined with ceramic or be unlined and targets of FIGURES 2, 6 and 7 could be made of ceramic material or metal, as desired.

The bed of noncatalytic, nonreactive, ceramic pebbles 28 shown in FIGURE 1 is only one form of ceramic bed preferred in the present invention which will provide channels conducive to substantially vertical flow free from turbulence of a greater size than the diameter of said channels. Other suitable forms of ceramic beds are shown in FIGURES 10, 11 and 12.

In FIGURE 10 a checkerwork of ceramic bricks 46 has been stacked in the reactor 26. Obviously, this is substantially the equivalent of pouring the ceramic pebbles 47 into reactor 26 of FIGURE 1 to form bed 28.

In FIGURE 11 a plurality of ceramic tubes 48 are placed with their axes vertical in reactor 26. The tubes are close enough to touch and substantially fill the entire cross-sectional area of the interior of the reactor 26. While the bottoms of tubes 48 may rest on the bottom of the reactor 26 and be useful in the practice of this invention, it is preferred to have a shallow bed of ceramic pebbles 47 in the bottom of reactor 26 for the lower ends of ceramic tubes 26 to rest on.

In FIGURE 12 the bed is composed of ceramic rods which fill the lower half of reactor 26 disposed with their axes vertical and preferably touching each other, the space in between the rods forming passages for the linear vertical flow of feedstock therethrough. As in the case of the tubes in FIGURE 11, rods 49 in FIGURE 12 may rest on the bottom of reactor 26 but preferably rests on a shallow bed of ceramic pebbles 47 as shown.

In FIGURE 13 the ceramic lining 42A of reactor 26 is reinforced by reinforcing wires 51 preferably in the form of a screen which is supported from the walls of reactor 26 at spaced points by metal pins 52 preferably secured to reactor 26 and wires 51 by welding.

In FIGURE 14, reactor 26 is lined with a ceramic lining in the form of firebricks 53 which are laid in place and may be further secured together by a ceramic mortar or cement.

The volume of the portion 28 of the reactor 26 which is packed should be ¼ to 3 times the volume of the free space portion 27 of the reactor which is not packed and it has been found preferable that it should be ½ to 2 times the volume of said free space. This insures that the residence time in this free portion 27 is greater than the residence time in the packed portion so that preferably 50 to 80 percent of the conversion due to the reaction takes place in the unpacked portion 27. The pressure in the reactor 26 may vary widely, depending on the specific reaction being carried out. For example, in hydrodealkylation of toluene with a hydrogen-to-toluene molecular ratio of 3:1 to 8:1, a suitable reactor pressure is 300 to 800 p.s.i.g.

When pebbles 47 are used in the reactor, their diameter should be between ½ and 5 inches and the same dimensions apply to the size of bricks 46 and the diameters of rods 49 and tubes 48, which rods or tubes may be as long as the packed portion 28 of chamber 26. The internal diameter of reactor 26 should be at least 5 times the internal diameter of whichever pipe 24 or 29 has the smaller diameter (pipes 24 and 29 may have the same diameter, as shown, or one may be somewhat smaller in internal diameter than the other if desired).

The temperature reached in preheating tube 18 should be only sufficient to start the reaction, while the temperature in the open space 27 of reactor 26 should be high enough to carry on the reaction at an economic rate of reaction. If the reaction will start at ambient temperatures upon mixing the reactants in pipes 17 and 23, then the heating step and heater 21 can be omitted. The temperature in packed bed 28 should slowly rise from its inlet at 27 to its outlet 29 sufficiently to carry the reaction to economic completion and the temperature of quench 31 should quench the product in line 32 to a temperature at which the reaction is substantially ended.

Any ceramic material of the prior art which is capable of withstanding temperatures up to 1400° F. may be employed for the ceramic portions of the present invention, provided it is noncatalytic and nonreactive, which can be determined by simple tests before installing the same in a commercial embodiment of this invention.

*Example*

A toluene feed in pipe 16 containing 3.5 mols $H_2$ from pipe 23 per mol of toluene at 500 p.s.i.g. is preheated to 1040° F. in furnace 19 and charged to the unpacked zone 27 of the reactor 26. The reactants are constantly well mixed in this zone, so that it is essentially isothermal. The feed rate and reactor size are within the limits given above and are such as to give a residence time in this zone of about 83 seconds. The lower half 28 of the reactor contains random packed alumina pebbles 1 inch in diameter, the upper half being unpacked. The toluene is 70 percent dealkylated in this zone and the temperature is 1250° F. throughout this unpacked zone because of heat supplied from the reaction and turbulence and mixing in said zone.

The reaction mixture passes to a packed section 28 in which the additional reaction time is about 28 seconds. In the absence of substantial back-mixing in this section, the temperature rises as conversion proceeds and the effluent temperature is 1310° F. Total conversion of the toluene is 91 percent to essentially equal mols of benzene and methane.

The same reaction is carried out with the same charge composition, inlet temperature and reaction pressure in a reactor having an empty, elongated, cylindrical chamber in which essentially no back-mixing takes place. The temperature in the empty chamber has an adiabatic profile from 1040° F. at the inlet to 1088° F. at the outlet and with a residence time of 115 seconds the total conversion of the toluene is 16 percent to essentially equal mols of benzene and methane.

While a specific example has been given and specific apparatus has been shown for the purpose of illustrating the invention, obviously the invention is not limited thereto.

Having described my invention, I claim:

1. The process of conducting an exothermic thermal hydrodealkylation of an alkylaromatic hydrocarbon selected from the group consisting of toluene, ortho xylene, meta xylene, and para xylene in a reaction chamber at least the upper ¼ of which is unpacked to form a preliminary reaction zone and at least the lower ⅕ of which is packed with a permeable bed of solids to form a final reaction zone, comprising the steps of mixing the selected alkylaromatic hydrocarbon with from 3 to 8 mols of hydrogen per mol of hydrocarbon, preheating the mixture to between about 1000 and 1100° F. to start the reaction, introducing said mixture into said upper preliminary zone in a manner causing constant mixing and a constant temperature therein of about 1150 to 1250° F. with a residence time therein sufficient for over 50 percent of the reaction to occur therein, passing said reacting mixture and resulting products down through said final reaction zone in substantially linear flow with an adiabatic increase in temperature to about 1250 to 1350° F. at the bottom of the bed, and next quenching the remaining mixture and products of reaction to below 1100° F. before passing the same to any enlarged unpacked chamber and separating out the hydrodealkylated resulting aromatic hydrocarbon.

2. The process of conducting an exothermic thermal hydrodealkylation of an alkylaromatic hydrocarbon selected from the group consisting of toluene, ortho xylene, meta xylene, and para xylene in a reaction chamber at least the upper ⅓ of which is unpacked to form a preliminary reaction zone and at least the lower ⅓ of which is packed with a permeable bed of solids to form a final reaction zone, comprising the steps of mixing the selected alkylaromatic hydrocarbon with from 3 to 8 mols of hydrogen per mol of hydrocarbon, preheating the mixture to between about 1000 and 1100° F. to start the reaction, introducing said mixture into said upper preliminary zone in a manner causing constant mixing and a constant temperature therein of about 1150 to 1250° F. with a residence time therein sufficient for over 50 percent of the reaction to occur therein, passing said reacting mixture and resulting products down through said final reaction zone in substantially linear flow with an adiabatic increase in temperature to about 1250 to 1350° F. at the bottom of the bed, and next quenching the remaining mixture and products of reaction to below 700° F. before passing the same to any enlarged unpacked chamber and separating out the hydrodealkylated resulting aromatic hydrocarbon.

3. The process of conducting an exothermic thermal hydrodealkylation of an alkylaromatic hydrocarbon in a reaction chamber at least the upper ¼ of which is unpacked to form a preliminary reaction zone and at least the lower ⅕ of which is packed with a permeable bed of solids to form a final reaction zone, comprising the steps of mixing the selected alkylaromatic hydrocarbon with from 3 to 8 mols of hydrogen per mole of hydrocarbon, preheating the mixture to between about 1000 and 1100° F. to start the reaction, introducing said mixture into said upper preliminary zone in a manner causing constant mixing and a constant temperature therein of about 1150 to 1250° F. with a residence time therein sufficient for over 50 percent of the reaction to occur therein, passing said reacting mixture and resulting products down through said final reaction zone in substantially linear flow with an adiabatic increase in temperature to about 1250 to 1350° F. at the bottom of the bed, and next quenching the remaining mixture and products of reaction to below 1100° F. before passing the same to any enlarged unpacked chamber and separating out the hydrodealkylated resulting aromatic hydrocarbon.

4. The process of claim 3 in which the reactants are introduced into the preliminary reaction zone substantially tangentially thereto to cause turbulent mixing therein.

5. The process of claim 3 in which the reactants are introduced radially into the preliminary reaction zone to cause turbulent mixing therein.

6. The process of claim 3 in which the reactants are introduced as a stream into the preliminary zone against a baffle to cause turbulent mixing therein.

7. The process of conducting an exothermic thermal hydrodealkylation of an alkylaromatic hydrocarbon in a reaction chamber at least the upper ⅓ of which is unpacked to form a preliminary reaction zone and at least the lower ⅓ of which is packed with a permeable bed of solids to form a final reaction zone, comprising the steps of mixing the selected alkylaromatic hydrocarbon with from 3 to 8 mols of hydrogen per mol of hydrocarbon, preheating the mixture to between about 1000 and 1100° F. to start the reaction, introducing said mixture into said upper preliminary zone in a manner causing constant mixing and a constant temperature therein of about 1150 to 1250° F. with a residence time therein sufficient for over 50 percent of the reaction to occur therein, passing said reacting mixture and resulting products down through said final reaction zone in substantially linear flow with an adiabatic increase in temperature to about 1250 to 1350° F. at the bottom of the bed, and next quenching the remaining mixture and products of reaction to below 700° F. before passing the same to any enlarged unpacked chamber and separating out the hydrodealkylated resulting aromatic hydrocarbon.

References Cited by the Examiner

UNITED STATES PATENTS

| | | | |
|---|---|---|---|
| 2,330,068 | 9/43 | Marancik et al. | 23—288 |
| 2,520,146 | 8/50 | Houdry | 23—288 |
| 2,655,442 | 10/53 | Mayland et al. | 23—288 |
| 2,697,026 | 12/54 | Mantell et al. | 23—288 |
| 2,808,317 | 10/57 | Schmalenbach et al. | 23—288 |
| 2,888,329 | 5/59 | Timmerman et al. | 23—288 |
| 2,929,775 | 3/60 | Aristoff et al. | 260—672 |

ALPHONSO D. SULLIVAN, *Primary Examiner.*